United States Patent [19]

Okada

[11] Patent Number: 4,865,505

[45] Date of Patent: Sep. 12, 1989

[54] STRUCTURE FOR MOUNTING AUTOMOBILE INTERIOR UPHOLSTERING MATERIAL

[75] Inventor: Shigeo Okada, Yokohama, Japan

[73] Assignee: Kato Hatsujo Kaisha, Ltd., Kanagawa, Japan

[21] Appl. No.: 146,683

[22] Filed: Jan. 21, 1988

[30] Foreign Application Priority Data

Feb. 28, 1987 [JP] Japan ............................ 62-29631[U]

[51] Int. Cl.$^4$ ...................... F16B 19/00; F16B 21/00
[52] U.S. Cl. .................................. 411/512; 411/508; 411/913; 403/408.1; 24/293
[58] Field of Search .................... 411/508–510, 411/512, 61, 516, 520, 522–524, 525, 526, 913; 24/293, 297, 541, 543, 563; 403/408.1, 406.1, 239, 243

[56] References Cited

U.S. PATENT DOCUMENTS

| | | | |
|---|---|---|---|
| 3,909,883 | 10/1975 | Fegen | 411/508 |
| 4,133,246 | 1/1979 | Small | 411/913 |
| 4,250,599 | 2/1981 | Nagashima et al. | 403/408.1 |
| 4,402,118 | 9/1983 | Benedetti | 24/293 |
| 4,644,612 | 2/1987 | Osterland | 24/293 |

FOREIGN PATENT DOCUMENTS 57-149312  3/1981  Japan .

Primary Examiner—Neill R. Wilson
Attorney, Agent, or Firm—Wenderoth, Lind & Ponack

[57] ABSTRACT

A part mounting structure for mounting a part having a boss portion on a panel having a mounting oblong hole includes a U-shaped leaf spring member made of metal for admitting and fixing thereto the boss portion of the part and a clip member made of synthetic resin for admitting the leaf spring member and engaging in the mounting oblong hole of the panel. The leaf spring member has opposite side walls thereof provided with outwardly folded engaging pieces and formed with a plurality of inwardly folded check pawls having sharp leading ends which wedge individually into the surface of the boss portion of the part. The clip member is formed into a cylindroid conforming to the shape of the mounting oblong hole of the panel, provided on opposite inner wall surfaces thereof with stepped portions which engage with the engaging pieces of the leaf spring member, and also provided on opposite outer wall surfaces thereof on the long side of the cylindroid with engaging portions which engage with the edge of the mounting oblong hole of the panel and on opposite outer wall surfaces thereof on the short side of the cylindroid with elastic engaging legs for dispelling positional and dimensional errors and having their leading ends engaged with the edge of the mounting oblong hole of the panel.

2 Claims, 3 Drawing Sheets

STRUCTURE FOR MOUNTING AUTOMOBILE INTERIOR UPHOLSTERING MATERIAL

BACKGROUND OF THE INVENTION AND PRIOR ART STATEMENT

The present invention relates to a part mounting structure for mounting a part such as an upholstering material in the interior of an automobile, e.g. a trim board, carpet fastening plate, on an automobile body panel using two members, i.e. a leaf spring member and a clip member.

Part mounting structures of this type have heretofore been proposed, such as, for example, in Japanese Utility Model Public Disclosure No. 57-149312.

The conventional part mounting structure is adapted to mount a part having a boss portion projecting integrally from the back side thereof on a body panel having a mounting oblong hole formed therein at a position corresponding to the position of the boss portion, and comprises a U-shaped leaf spring member made of metal for admitting the boss portion of the part and fixing the same thereto, a clip member made of synthetic resin for admitting the leaf spring member and engaging pieces and inwardly folded check pieces formed on the opposite side walls of the U-shaped leaf spring member. The clip member is formed into a cylindroid conforming to the shape of the mounting oblong hole and is provided on the inner wall thereof with stepped portions engaging with the engaging pieces and on the outer wall thereof on the long side of the cylindroid integrally with a pair of engaging portions engaging with the edge of the mounting oblong hole of the panel.

Where a part having a boss portion is mounted on a body panel by the use of the clip member and leaf spring member, at first the clip member and the leaf spring member are united into an integral unit by inserting the leaf spring member into the interior of the clip member to cause the engaging pieces of the leaf spring member to engage with the stepped portions of the clip member, thereafter the clip member is engaged with the mounting oblong hole of the body panel through the engaging portion and flange portion thereof, and subsequently the boss portion of the part is inserted between the opposite side walls of the U-shaped leaf spring member to cause the check pieces to wedge into the surface of the boss portion from the opposite sides thereof, thereby fixing the boss portion between the opposite side walls of the leaf spring member. The part is thus mounted on the body panel.

However, since a part such as a trim board has a plurality of boss portions projecting therefrom at regular intervals and the body panel has the same number of mounting oblong holes formed therein at the corresponding positions, if there are errors in position from which any of the boss portions projects and in position at which any of the mounting oblong holes is formed and/or there is an error in dimension between the mounting holes and the clip members, it will become impossible to engage all clip members with the mounting oblong holes with exactitude or to insert and fix all boss portions relative to the leaf spring members with exactitude. This makes it impossible to mount the part on the panel in a satisfactory and stable state.

In the conventional part mounting structure, since the clip member is engaged in the mounting oblong hole by mere engagement between the pair of engaging portions formed on the outer wall surface of the clip member on the long side of the cylindroid and the edge of the mounting oblong hole, a firmly engaged state of the clip member cannot be obtained and, since the boss portion is engaged with the leaf spring member by mere wedging of the flat edges of the check pawls into the surface of the boss portion, the force for fixing the boss portion is small from the outset. Thus, the conventional part mounting structure is disadvantageous in that the state of the mounted part is very instable.

OBJECT AND SUMMARY OF THE INVENTION

The present invention has been developed in order to effectively solve the aforementioned problems suffered by the conventional part mounting structure.

The main object of the present invention is to provide a part mounting structure capable of firmly mounting a part stably on a panel with exactitude at all times even in the presence of positional and dimensional errors.

To attain the object described above, according to the present invention, there is provided a part mounting structure for mounting a part having a boss portion on a panel having a mounting oblong hole, comprising a U-shaped leaf spring member made of metal for admitting and fixing thereto the boss portion of the part, and a clip member made of synthetic resin for admitting the leaf spring member and engaging in the mounting oblong hole of the panel, the leaf spring member having opposite side walls thereof provided with outwardly folded engaging pieces, the clip member being formed into a cylindroid conforming to the shape of the mounting oblong hole of the panel, and being provided on opposite inner wall surfaces thereof with stepped portions which engage with the engaging pieces of the leaf spring member and on opposite outer wall surfaces thereof on the long side of the cylindroid with engaging portions which engage with the edge of the mounting oblong hole of the panel, the opposite side walls of the leaf spring member being formed with a plurality of inwardly folded check pawls having sharp leading ends which wedge individually into the surface of the boss portion of the part, said clip member being provided on opposite outer wall surfaces thereof on the short side of the cylindroid with elastic engaging legs for dispelling positional and dimensional errors and having their leading ends engaged with the edge of the mounting oblong hole of the panel.

The above and other objects, characteristics features and advantages of the present invention will become apparent to those skilled in the art as the disclosure is made in the following description of a preferred embodiment of the invention, as illustrated in the accompanying drawings.

DETAILED DESCRIPTION OF THE PREFERRED EMBODIMENT

Figure 1:
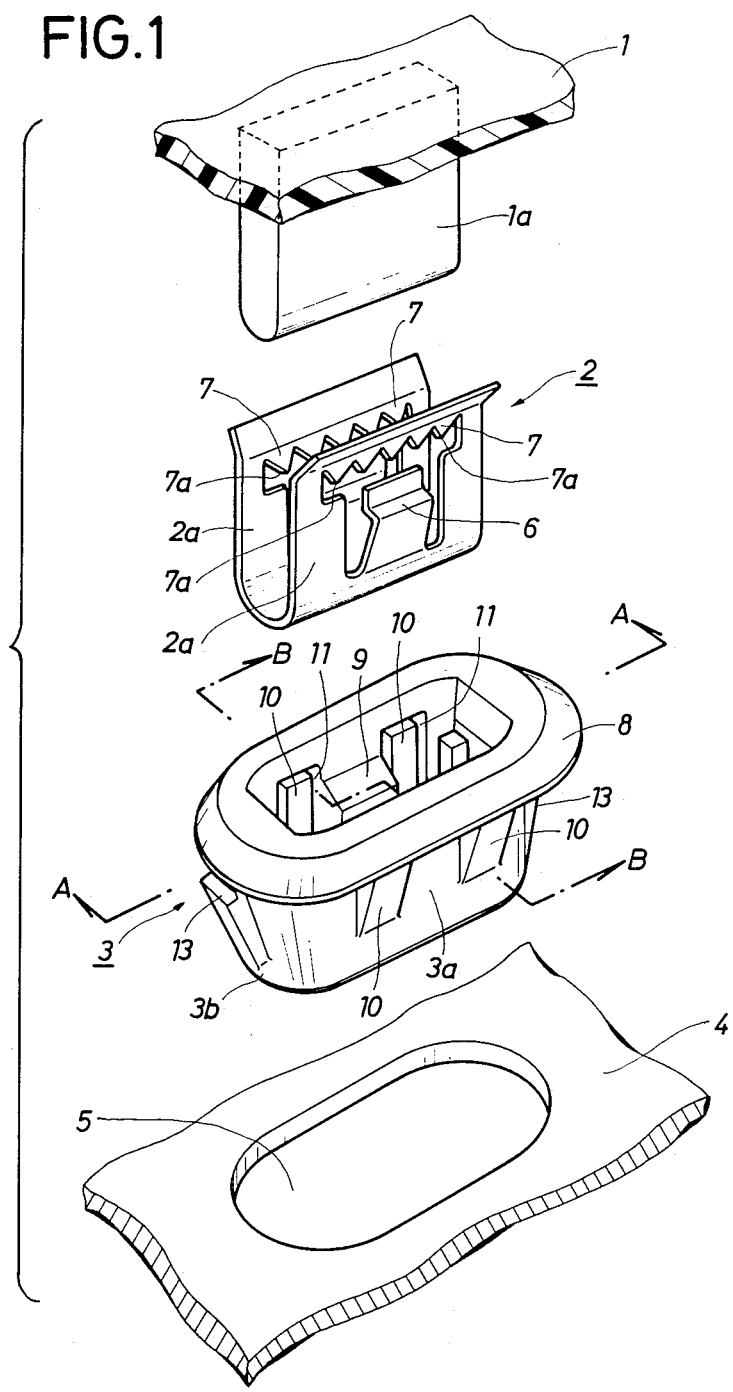
FIG. 1 is an exploded perspective view illustrating one embodiment of the part mounting structure according to the present invention.

The present invention will now be described in detail with reference to one illustrated embodiment. A part mounting reference to one illustrated embodiment. A part mounting structure in this embodiment comprises, as illustrated in FIG. 1, a U-shaped metal leaf spring member 2 for admitting a boss portion 1a of a part 1 such as an upholstering material in the interior of an automobile and fixing it thereto, and a synthetic resin clip member 3 for admitting the leaf spring member 2 and engaging with the edge of a mounting oblong hole 5 formed in a panel 4 such as an automobile body panel. The opposite side walls 2a of the U-shaped leaf spring member 2 are formed to have outwardly folded engaging pieces 6 each having a bent upper end and also have a plurality of inwardly folded check pawls 7 each having a sharp leading end 7a. The sharp leading ends 7a of the saw-toothed check pawls 7 can individually wedge into the surface of the boss portion 1a of the part 1 from the opposite sides thereof.

Figure 2A:
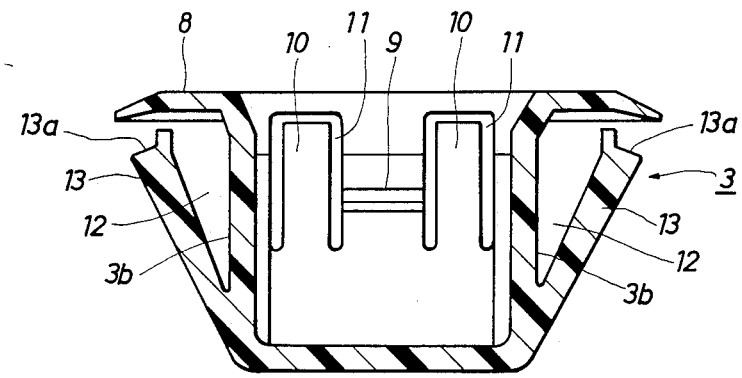
FIG. 2A is a cross section taken along line A—A in FIG. 1 and showing a cylindroid clip member.
Figure 2B:
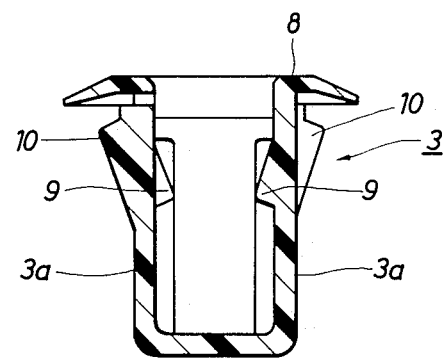
FIG. 2B is a cross section taken along line B—B in FIG. 1 and showing the cylindroid clip member.

As illustrated particularly in FIGS. 2A and 2B, the clip member 3 is formed into an elliptical cylinder with a bottom having a shape conforming to the shape of the mounting oblong hole 5 of the panel 4. The clip member 3 has a flange 8 formed on the open edge thereof and is provided at the center of the inner wall on the long side thereof integrally with a pair of opposite stepped portions 9 engaged elastically with the bent upper ends of the engaging pieces 6 of the leaf spring member 2. On the opposite sides of each stepped portion 9 there are formed slits 11 to define a pair of engaging portions 10. The two pairs of engaging portions 10 project outwardly from the opposite outer walls 3a on the long side of the cylindroid or ellipsoid clip member 3 to engage with the edge of the mounting oblong hole 5 of the panel 4.

The opposite outer walls 3b on the short side of the cylindroid or ellipsoid clip member 3 are provided integrally with a pair of elastic engaging legs 13 outwardly projecting upwardly from the outer walls 3b with a predetermined space 12 left between each of the engaging legs 13 and each of the outer walls 3b. The leading ends 13a of the pair of elastic engaging legs 13 engage with the edge of the mounting oblong hole 5 of the panel 4.

Therefore, the part 1 is mounted on the panel 4 with the clip member 3 and left spring member 2 having the aforementioned constructions by first inserting the leaf spring member 2 into the interior of the clip member 3 to engage the engaging pieces 6 of the leaf spring member 2 with the stepped portions 9 of the clip member 3, thereby uniting the clip member 3 and the leaf spring member 2 into an integral unit, and then fitting the clip member 3 in the mounting oblong hole 5 of the panel 4 by means of both the two pairs of engaging portions 10 formed on the outer walls 3a of the clip member 3 on the long side thereof and the pair of elastic engaging legs 13 formed on the outer walls 3b on the short side thereof.

Even given the case that there is an error in dimension between the mounting oblong hole 5 and the long side of the cylindroid clip member 3, the clip member 3 is easily moved and centered by the elastic force of the pair of elastic engaging legs 13 and is then fixed. Thus, the clip member 3 can be snugly fitted in the mounting oblong hole 5 at all times. Since the engaging portions 10 and elastic engaging legs 13 formed on the outer walls of the clip member 3 are engaged with the edge of the mounting oblong hole 5, a firmly fitted state can be ensured with exactitude.

Figure 3A:
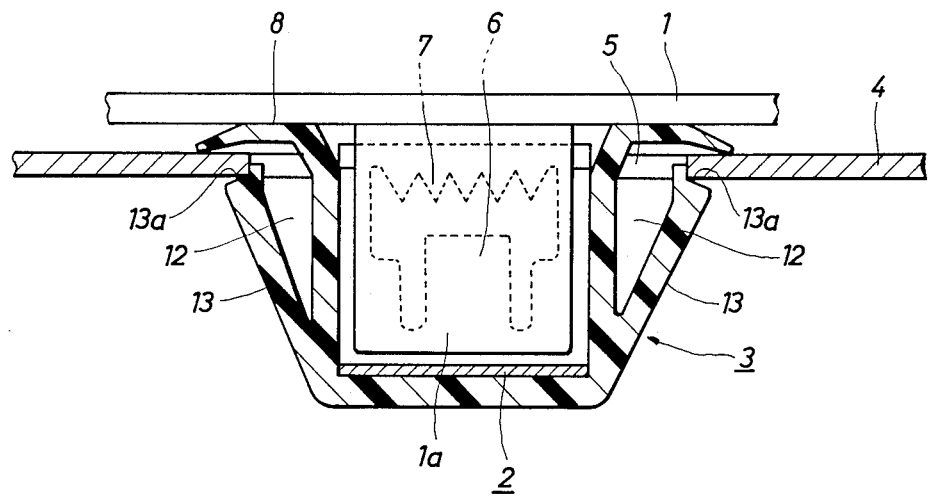
FIG. 3A is a cross section illustrating the major part of the part mounting structure seen from the long side of the cylindroid clip member.
Figure 3B:
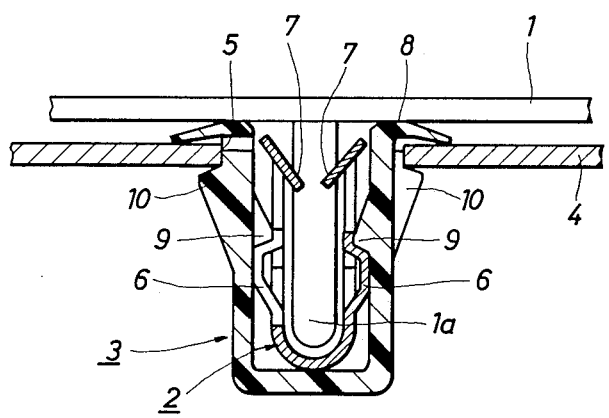
FIG. 3B is a cross section illustrating the major part of the part mounting structure seen from the short side of the cylindroid clip member.

The boss portion 1a of the part 1 is subsequently inserted between the opposite side walls 2a of the leaf spring member 2 to cause the individual sharp leading ends 7a of the check pawls 7 to wedge into the opposite surfaces of the boss portion 1a, with the result that the boss portion 1a is firmly fixed with exactitude between the opposite side walls 2a of the leaf spring member 2. Thus, the part 1 if firmly mounted stably on the panel 4 as illustrated in FIGS. 3A and 3B.

Further, in the aforementioned mounting operation, if there are errors in the position at which the mounting oblong hole 5 is formed and in the position from which the boss portion 1a projects, when the boss portion 1a is inserted into the leaf spring member 2, the errors can be effectively dispelled (absorbed) by the movement of the clip member 3 within the mounting oblong hole 5 caused by the flexing of the pair of elastic engaging legs 13 utilizing the spaces 12. Therefore, snug fitting of the boss portion 1a is guaranteed with exactitude at all times. Furthermore, since the individual sharp leading ends 7a of the plurality of check pawls 7 can effectively wedge into the boss portion 1a, the firmly fixed state of the boss portion 1a is guaranteed with exactitude.

If the width of the boss portion 1a is set smaller than ordinary in advance assuming that there will be produced errors in position at which the mounting oblong hole 5 is formed and in position from which the boss portion 1a projects, the aforementioned errors can be effectively dispelled by the smaller width of the boss portion 1a. Even in this case, the shorter boss portion 1a can be fixed with exactitude by the check pawls 7 having the sharp leading ends 7a. Thus, there is no fear of the fixing operation being hindered.

The part 1 is mounted on the panel 4, as described above, by fitting in the mounting oblong hole 5 the clip member 3 having the leaf spring member 2 inserted therein and then inserting the boss portion 1a into the leaf spring member 2 accommodated in the clip member 3. However, the mounting operation may be effected by the steps of first fitting the boss portion 1a of the part 1 into the clip member 3 through the leaf spring member 2 and then engaging the clip member 3 with the mounting oblong hole 5 of the panel 4 or by the steps of first causing the boss portion 1a and the clip member 3 to engage respectively with the leaf spring member 2 and with the mounting oblong hole 5 and then inserting the leaf spring member 2 into the clip member 3.

As has been described in the foregoing, according to the present invention, even if there are errors in the position at which the mounting oblong hole is formed and in the position from which the boss portion projects and/or there is an error in dimension between the mounting oblong hole and the clip member, these errors can be effectively dispelled (absorbed) by the free movement of the clip member within the mounting oblong hole caused by the flexing or elastic force of the pair of elastic engaging legs formed on the opposite outer walls of the cylindroid or ellipsoid clip member on the short side thereof, thus making it possible to stably mount the part on the panel with exactitude at all times.

Furthermore, since the individual sharp leading ends of the plurality of check pawls wedge into the surface of the boss portion of the part, the boss portion can be firmly fixed to the leaf spring member and, at the same time, since the clip member can be engaged in the mounting oblong hole by the engagement of the engaging portions and the elastic engaging legs formed on the outer walls on the long and short sides respectively of the cylindroid clip member with the edge of the mounting oblong hole, the state of very enhanced engagement of the clip member in the mounting oblong hole can be obtained. According to the present invention, therefore, it is guaranteed from these aspects that the part can be mounted on the panel with higher exactitude.

What is claimed is:

1. A structure for mounting an upholstering material of the type having a boss portion on an automobile panel having a mounting oblong hole, said structure comprising:

a U-shaped metal leaf spring member for receiving therein and fixing thereto a boss portion of an upholstering material, said leaf spring member having spaced opposed side walls, each said side wall having a plurality of inwardly directed check pawls at an upper portion thereof, each one of said plurality of inwardly directed check pawls having a sharp sawtooth-like leading end for engaging a surface of a boss portion of an upholstering material when a boss portion is received therein, each said side wall having an outwardly extending engaging piece at a lower portion thereof, and each said engaging piece having an inwardly extending upper end for engaging a stepped portion of a clip member; and a synthetic resin clip member for receiving said leaf spring member therein and for engaging a mounting oblong hole of a panel, said clip member being substantially an ellipsoid for mating with the shape of a mounting oblong hole of a panel, said clip member having spaced opposed inner wall surfaces, a stepped portion on each said inner wall surface for engaging said inwardly extending upper end of said engaging pieces of said leaf spring member, said clip member having spaced opposed pairs of outer wall surfaces on the pair of longer sides of said ellipsoid and on the pair of shorter sides of said ellipsoid respectively, said pair of outer wall surfaces on the pair of longer sides of said ellipsoid clip member having engaging portions for engaging an edge of a mounting oblong hole of a panel, said pair of outer wall surfaces on the shorter side of said ellipsoid each having an elastic engaging leg for engaging an edge of a mounting oblong hole for elastically deforming for dispelling positional and dimensional errors between said clip member and a mounting oblong hole when said clip member is inserted in a mounting hole, and a plurality of slits in each said longer outer wall surface of said ellipsoid clip member for defining a pair of outwardly projecting engaging portions on each said longer outer wall surface, and each said outwardly projecting engaging portion resiliently engaging with an edge of a mounting oblong hole for elastically deforming for dispelling positional and dimensional errors between said clip member and a mounting hole when said clip member is inserted in a mounting hole.

2. A part mounting structure as in claim 1, wherein each of said elastic engaging legs of said clip member projects outwardly upwardly, and a predetermined space is defined between each of said elastic engaging legs and each of the opposed shorter outer wall surfaces of said clip member.

* * * * *